United States Patent [19]

Kopera, Jr.

[11] 3,868,570

[45] Feb. 25, 1975

[54] ELECTRONIC DIGITAL SPEEDOMETER

[75] Inventor: Joseph J. Kopera, Jr., Trenton, Mich.

[73] Assignee: Chrysler Corporation, Highland Park, Mich.

[22] Filed: Sept. 28, 1973

[21] Appl. No.: 401,745

[52] U.S. Cl. ............... 324/166, 324/174, 324/78 D, 235/92 FQ
[51] Int. Cl. ............................................. G01p 3/48
[58] Field of Search ........... 324/166, 171, 173, 174, 324/175, 78 D, 79 D; 235/92 AE, 92 FQ, 92 T, 92 F, 92 DN

[56] References Cited
UNITED STATES PATENTS

| | | | |
|---|---|---|---|
| 3,614,617 | 10/1971 | Blake | 324/171 |
| 3,739,270 | 6/1973 | Miller | 324/166 |
| 3,769,583 | 10/1973 | Spencer | 324/78 D |

Primary Examiner—Michael J. Lynch
Attorney, Agent, or Firm—Talburtt & Baldwin

[57] ABSTRACT

An electronic digital speedometer having a liquid crystal display for displaying the speed of a motor vehicle. The speedometer is responsive to a plurality of speed pulses generated by a magnetic transducer and a tone wheel located in the transmission. A crystal controlled oscillator provides a source of high frequency timing pulses for controlling the solid state logic elements used to process the pulses from the transducer. An odometer circuit is also responsive to the speed pulses and records the distance travelled by the motor vehicle. In addition, a variable display interval computer is described for controlling the interval between successive changes in the display according to the magnitude of change in vehicle speed.

4 Claims, 7 Drawing Figures

ELECTRONIC DIGITAL SPEEDOMETER

BACKGROUND OF THE INVENTION

1. Field of Invention

This invention relates to electrical speed measuring devices in general and in particular to motor vehicle speed measuring devices having a speed related frequency generator and a digital liquid crystal display.

2. Summary of Invention

It is a principal object of the invention to provide a motor vehicle speedometer having a liquid crystal digital display for displaying the speed of the vehicle.

It is another object of the invention to logically process the speed indicating signals by means of solid state devices.

It is a further object of the invention to automatically control the display time of the liquid crystal display according to the magnitude of the speed change.

It is another object of the invention to provide a speedometer with a high degree of accuracy in displaying the vehicle speed.

These and other objects which will hereinafter become apparent are disclosed in the following description of an electronic digital speedometer. The speedometer is comprised of a section for receiving speed responsive pulses from a magnetic transducer and converting these speed responsive pulses into pulse waveshapes having fast rise and fall times. The speed responsive pulses are processed in solid state logic circuitry by a crystal controlled high frequency oscillator and a master timer counter to generate a counting signal for a speed counter. The configuration of the tone wheel is such that for a predetermined period of time, the number of the speed responsive pulses from the transducer is equal to the speed of the vehicle in miles per hour. At the end of the predetermined period of time, the count generated by the counting signal and contained in the speed counter is transferred through a BCD to seven-segment decoder for display in a liquid crystal display unit.

DETAILED DESCRIPTION

Figure 1:
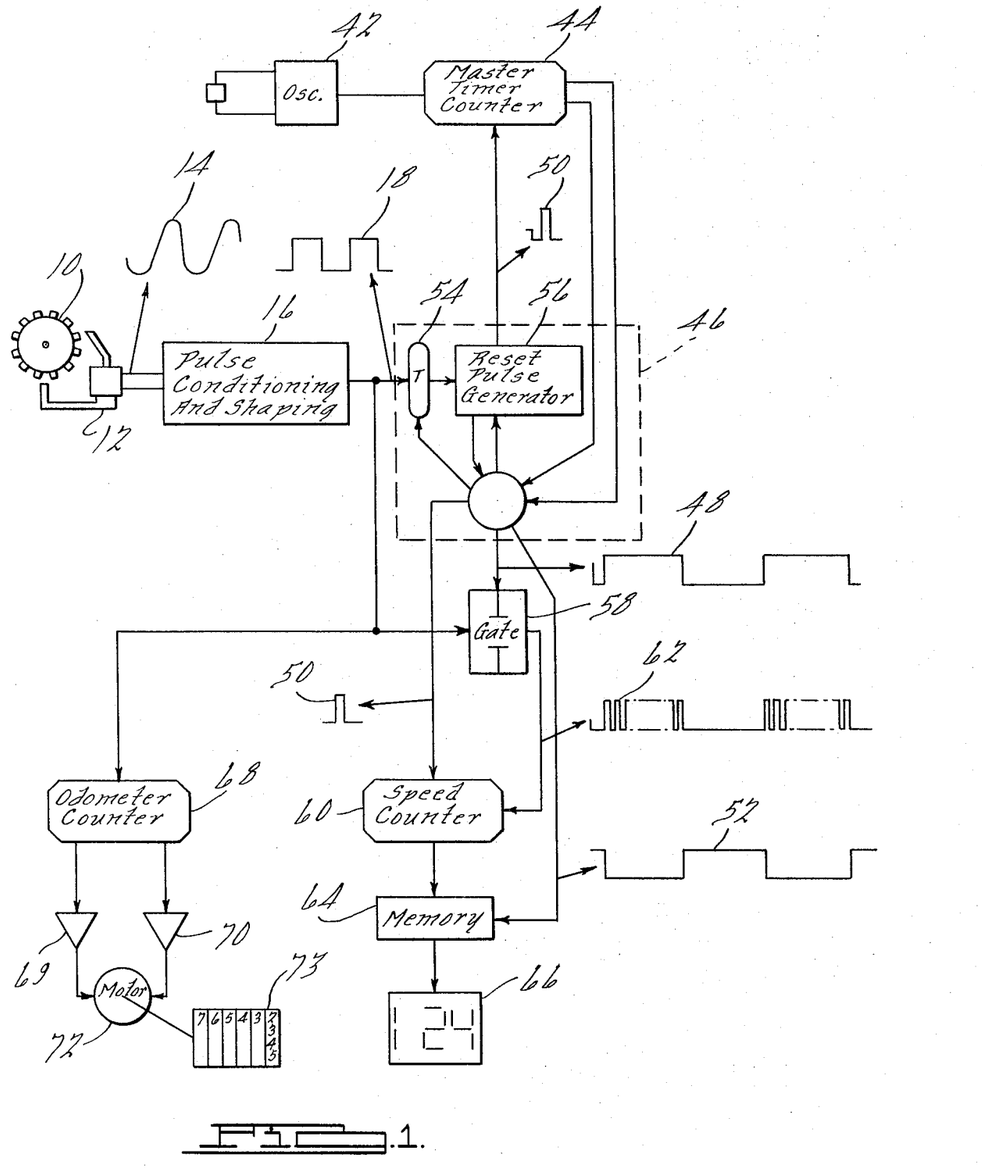
FIG. 1 is a block diagrammatic schematic of the electronic digital speedometer.

Referring to the Figs. by the characters of reference, there is illustrated in FIG. 1 a block diagrammatic schematic of the electronic digital speedometer according to the present invention. The speedometer may be used in a motor vehicle such as automobile to digitally display the speed of the automobile to the driver in a numerical value which may be in any units having a label of distance per unit time.

The digital speedometer depends upon a source of speed responsive pulses, or speed pulses, which are derived from a mechanism responsive to the movement of the vehicle. Typically, in speedometer applications, only the forward movement of the vehicle is indicated; however, the present invention displays both forward and reverse speed of the vehicle.

In the preferred embodiment of the present invention, the source of speed pulses is a tooth-shaped tone wheel 10 located in or connected to the transmission of the vehicle to rotate whenever the vehicle is moving. A magnetic transducer 12 of any well-known construction is positioned in such a relationship to the tone wheel 10 so that an alternating voltage signal 14 is generated as each tooth of the tone wheel 10 passes the transducer 10.

Figure 5:
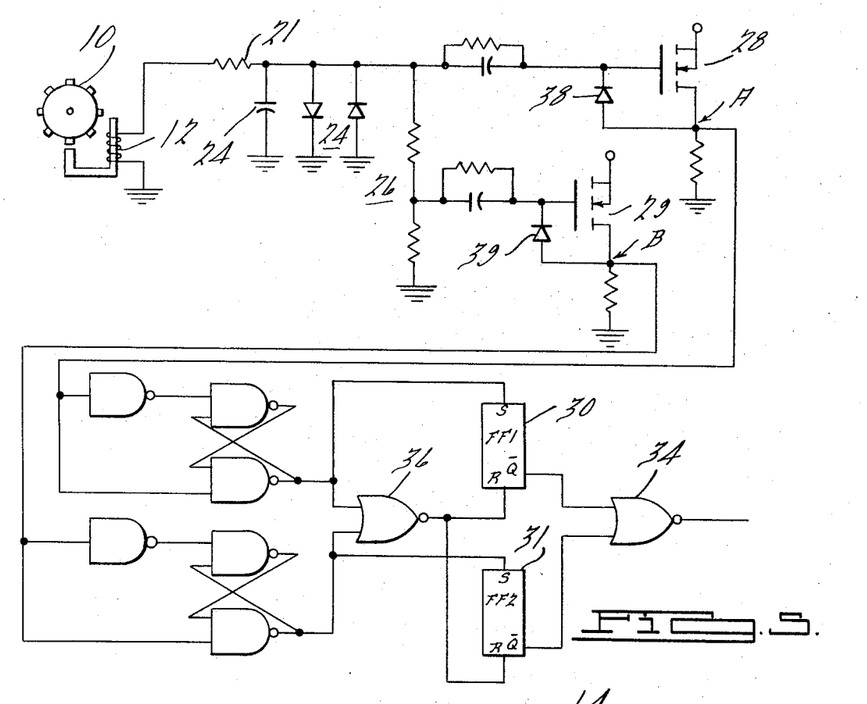
FIG. 5 is a schematic of a circuit that may be used for the pulse conditioning and shaping in FIG. 1.

The signals from the transducer 12 are received over a suitable length of cable by pulse conditioning and shaping means 16 such as illustrated in detail in FIG. 5. The purpose of the pulse conditioning and shaping means is to remove from the incoming signal, noise voltages which may be superimposed thereon and generate substantially rectangular-shaped pulses 18 which are the speed responsive pulses.

Since the magnetic transducer is responsive to flux changes per unit of time, noise signals may be a problem at very low speeds. As the vehicle speed increases, the signal generated by the transducer has sufficient voltage amplitude so that the signal to noise ratio is large.

The detailed circuitry of FIG. 5 shows that signal 14 from the transducer 12 is passed through a low pass filter comprising the series resistor 21 and the by-pass capacitor 22. The signal is then passed through the double diode symmetrical clipping circuit 24 to a voltage divider circuit 26.

The voltage divider circuit 26 functions to provide a noise threshold voltage level to the gate circuits of a pair of MOSFETS 28 and 29. The normal condition of each MOSFET is on and upon a pulse of sufficient voltage magnitude, the MOSFET will turn off.

Figure 6:
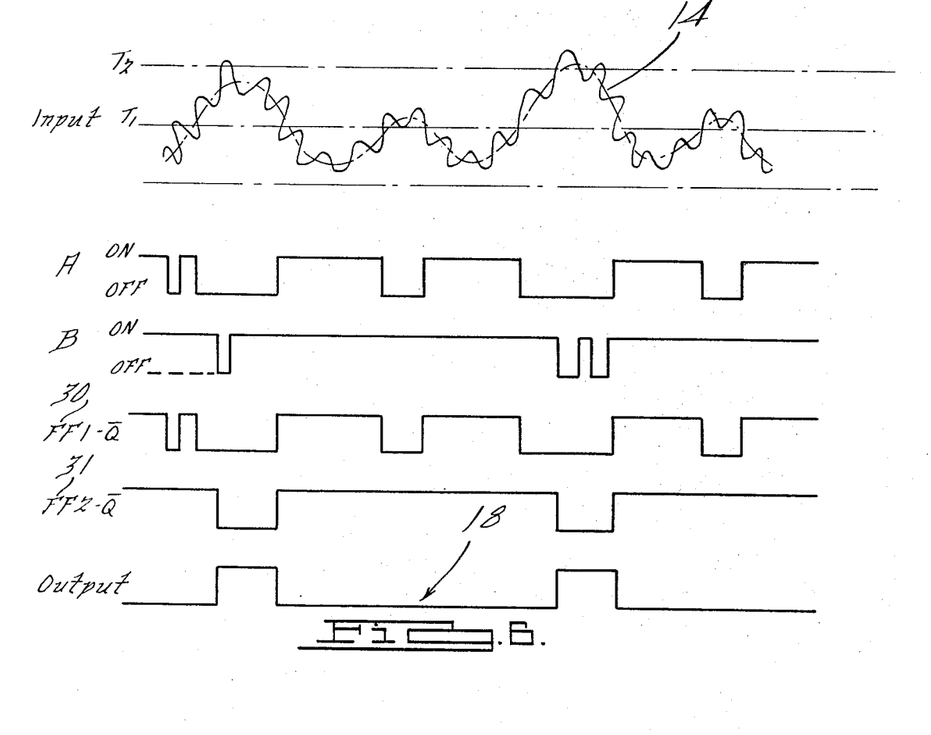
FIG. 6 is a voltage waveform of the circuit of FIG. 5.

At low speeds, a pulse of sufficient magnitude will turn off the first MOSFET 28 but may not be large enough to turn off the second MOSFET 29. This is illustrated in FIG. 6 wherein the sinusoidal noise signals riding on the very low frequency wave will cross the threshold of the first MOSFET 28 generating the waveshape A of FIG. 6 but will not cross the threshold of MOSFET 29. When the first MOSFET 28 turns off, this causes its corresponding flip flop, FF1 30, (FIG. 5) to be set. When the first MOSFET 28 is turned on, FF1 will reset as shown in FF1-Q̄ waveshape of FIG. 6. Until the input waveshape crosses the threshold of the second MOSFET 29, it will not turn off and its corresponding flip flop, FF2 31, remains reset. This is illustrated in the waveshapes B and FF2-Q̄ of FIG. 6.

When both MOSFETS 28 and 29 are turned off, the logic circuitry of FIG. 5 will cause both FF1 30 and FF2 31 to be set. The output 18 from the output NOR gate 34 will be high or true as long as both flip flops 30 and 31 are true.

When both MOSFETS 28 and 29 are driven back into conduction, the reset NOR gate 36 will have its inputs driven low causing a high pulse to be applied to the reset inputs of the flip flops 30 and 31 thereby resetting them. This causes the output from output NOR gate 34 to go low.

The diodes 38 and 39 interconnecting the gate and source of each MOSFET, 28 and 29, holds the MOSFET into conduction so that a small voltage level at the gate may turn the MOSFET off.

The output signal 18 of the pulse conditioning and shaping means 16 is a pulse waveform shaped into rectangular wave signals having relatively sharp rise and fall times. The sharp rise and fall times are necessary for actuation of the digital logic circuitry of the electronic speedometer.

Contained within the speedometer circuit of FIG. 1 is a source 42 of high frequency pulses which are used within the speedometer for the various timing operations contained therein. In the preferred embodiment the source of pulses is a crystal oscillator 42 having a frequency in excess of 4 MHz. The output of the oscillator 42 is supplied to a master timer counter 44 for generating a plurality of pulses at predetermined intervals that are independent of the pulse intervals from the pulse shaper circuit 16. It is through the use of selected pulses from the master timer 44 that the several circuits of the electronic speedometer are activated. As will hereinafter be shown in the preferred embodiment, the number of speed pulses 18 counted in a period of 125 milliseconds is numerically equal to the speed of the vehicle in miles per hour.

A control means 46 responsive to the pulses from the master timer counter 44 and the speed pulses from the pulse shaper 16 operates to generate control signals such as a gate control signal 48, a counter control signal 50 and a memory strobe signal 52. Within the control means 46 there is a trigger circuit 54 electrically connected to the pulse shaper circuit 16 which functions to indicate to the speedometer that the vehicle is moving. The output of the trigger circuit 54 is supplied to the reset pulse generator circuit 56 functioning to synchronize the several counters within the electronic speedometer. The accurate timing from the master timer counter 44 allows the opening of the gating means 58 thereby transferring speed pulses 18 from the pulse shaper 16 for a predetermined time.

The gating means 58 is responsive to the timing signals from the control means 46 and speed pulses from the pulse shaper 16 and operates to gate or control these speed pulses to a speed counter 60 for a predetermined interval. As previously indicated, in the preferred embodiment, this interval is 125 milliseconds.

The output 62 of the gating means 58 is supplied to the speed counter 60 that has been initially reset by a signal 50 from the control means 46 and is counted by the speed pulses from the gating means 58. As previously indicated, the speed counter 16 is reset simultaneously with resetting of the master timer counter 44 and functions to count only for the predetermined interval as defined by the gating means 58. The output of the speed counter 60 when the gating means 58 is closed, is supplied to a memory circuit 64 which may be a plurality of bi-stable flip flops for holding the count for a predetermined period of time for display purposes.

The output of the memory circuit 64 is supplied to a display means 66 such as a liquid crystal display. The display has a decoder attached thereto for decoding the output of the memory circuit which is typically in binary coded decimal form, into the proper energization of the segments of the liquid crystal display.

As the speed counter 60 is counting, the count is constantly changing; however, the memory circuit 64 maintains the count for the last displayed speed for a predetermined time to prevent the liquid crystal display 66 from constantly flashing during counting. Thus, while the vehicle is moving, the liquid crystal display 66 will maintain and hold the displayed speed even though the speed counter is contantly being counted from zero to the updated or new speed.

The output from pulse shaper 16 is also supplied to an odometer 68. The odometer 68 is a counter for dividing the frequency of the speed pulses 18 from the pulse shaper 16 by predetermined values to indicate the distance travelled by the vehicle. The output of the odometer 68 is supplied to a driver circuit 69 and 70 of a stepper motor 72. The stepper motor 72 has a rotatable shaft attached to which is an odometer display of at least one wheel 73 having a plurality of numerical indicators equally spaced around the periphery thereof. The odometer 68 divides the speed pulses 18 from the pulse shaper circuit 16 in such a manner that one rotation of the wheel 73 represents a predetermined distance. In a typical motor vehicle, there would be six wheels 73 to record distance in miles from the units of tenths of a mile to tens of thousands of miles.

Figure 2:
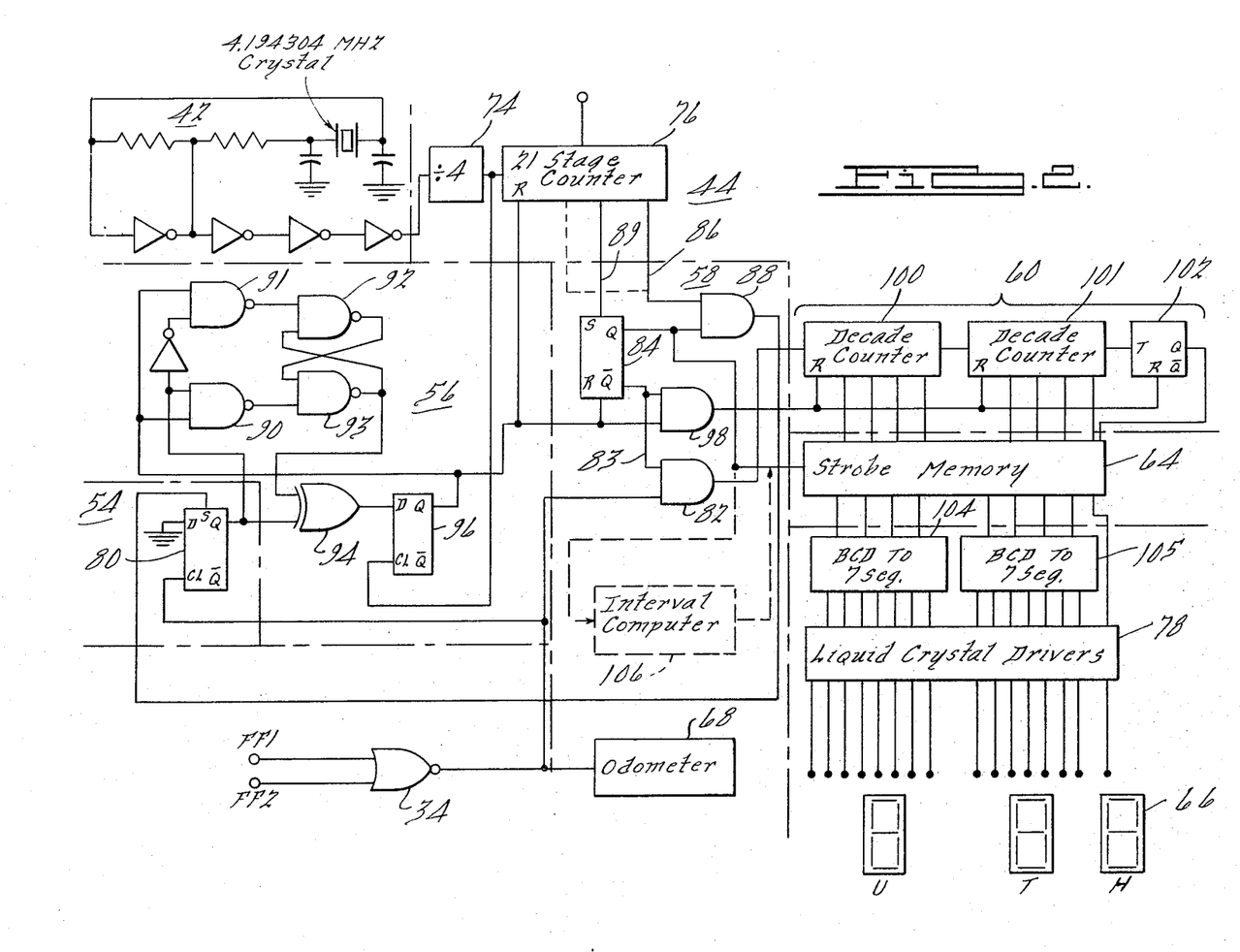
FIG. 2 is a logic schematic of the speedometer of FIG. 1.

Referring to FIG. 2 there is illustrated in logic schematic form the electronic digital speedometer of the preferred embodiment of the invention. The several sections of the block diagram of FIG. 1 are identified in the schematic of FIG. 2. The oscillator 42 as illustrated in the upper left-hand corner of FIG. 2 is a crystal-controlled oscillator of conventional construction and functions to generate square wave pulses having a frequency of 4.194 MHz. The output of the crystal oscillator 42 is supplied to a divide by four circuit 74 for generating a clock signal for the logic of the speedometer of approximately 1 MHz. This 1 MHz signal is supplied to another counter 76 in the master timer counter 44 and also to the reset pulse generator circuit 56 within the speedometer. As previously indicated, the function of the reset pulse generator 56 is to generate pulses 50 and 51 to reset the several counters 44 and 60 in the speedometer in preparation to receive the speed input pulses 18. In addition, during movement of the vehicle the reset pulse generator 56 will generate a second reset pulse 51 simultaneous with the occurrence of a leading edge of a speed input pulse 18 thereby again resetting the counters 44 and 60 and allowing the speed counter 60 to count the next leading edge of the speed pulses 18. In this manner, the display is stabilized thereby eliminating jitter normally found in the least significant digit.

The output of the one MHz counter 74 is also connected to a counter 76 having 21 stages to divide the 1 MHz signal to a 0.5 hertz signal. Of particular interest from the counter are three signals, mainly a signal equal to 64 hertz, a signal equal to 4 hertz, and a signal equal to 0.5 hertz.

The signal equal to 64 hertz is used in a well-known manner in the power supply of the liquid crystal drivers 78 and, therefore, provide the proper operating voltages across the liquid crystal display 66.

The signal generated at the 4 hertz signal functions to control the opening of the speed counting window of the gating means 58 and operates to allow counting for 125 milliseconds.

The 0.5 hertz signal is used to strobe the memory and thereby control the display time period of the liquid crystal display 66 allowing a 1 second display before changing to an update speed.

The selection of the last two signals, mainly the 4 hertz signal and 0.5 hertz signal, is a function of the tone wheel design and location inasmuch as the 4 hertz signal operates to allow a direct correlation between the number of speed pulses received on the input to the speedometer and the speed of the vehicle in miles per hour. The 0.5 hertz signal maintains the display for a 1 second interval. If it is desired to have this display for a longer or shorter interval another output of lower or higher frequency may be selected from the counter. Additional stages of the counter may be added to have the display for a longer interval.

The pulse shaping means 16 in the lower left-hand corner of FIG. 2 is more fully illustrated in FIG. 5. The output NOR gate 34 is illustrated receiving the series of speed responsive pulses from the pulse shaping circuit flip flops 30 and 31. The output pulses 18 of the pulse shaping means 16 are supplied to the trigger flip flop 80 of the control means 46. As indicated in FIG. 2 the trigger flip flop 80 is a "D" type flip flop wherein the "D" input is grounded and the clock input is electrically connected to the pulse shaper means 16. Additionally, the output of the pulse shaper means 16 is connected to the odometer circuit 62 in a manner to be explained in conjunction with the description of FIG. 4.

The output of the pulse shaper means 16 is also supplied to a gate 82 in the gating means 58 which is a dual-input AND gate 82 wherein the second input 83 is from the "Q̄" output from the control flip flop 84. The control flip flop 84 supplies the control or opening signal for the gate 82 allowing the speed pulses to transfer through the gate 82 to the speed counter 60.

The reset pulse generator 56 operates to supply a reset pulse 50 at the end of the display time of the liquid crystal display 66 and also a second reset pulse 51 very quickly thereafter to synchronize the counter with a full width pulse 62 from the pulse shaper 16.

Figure 3:
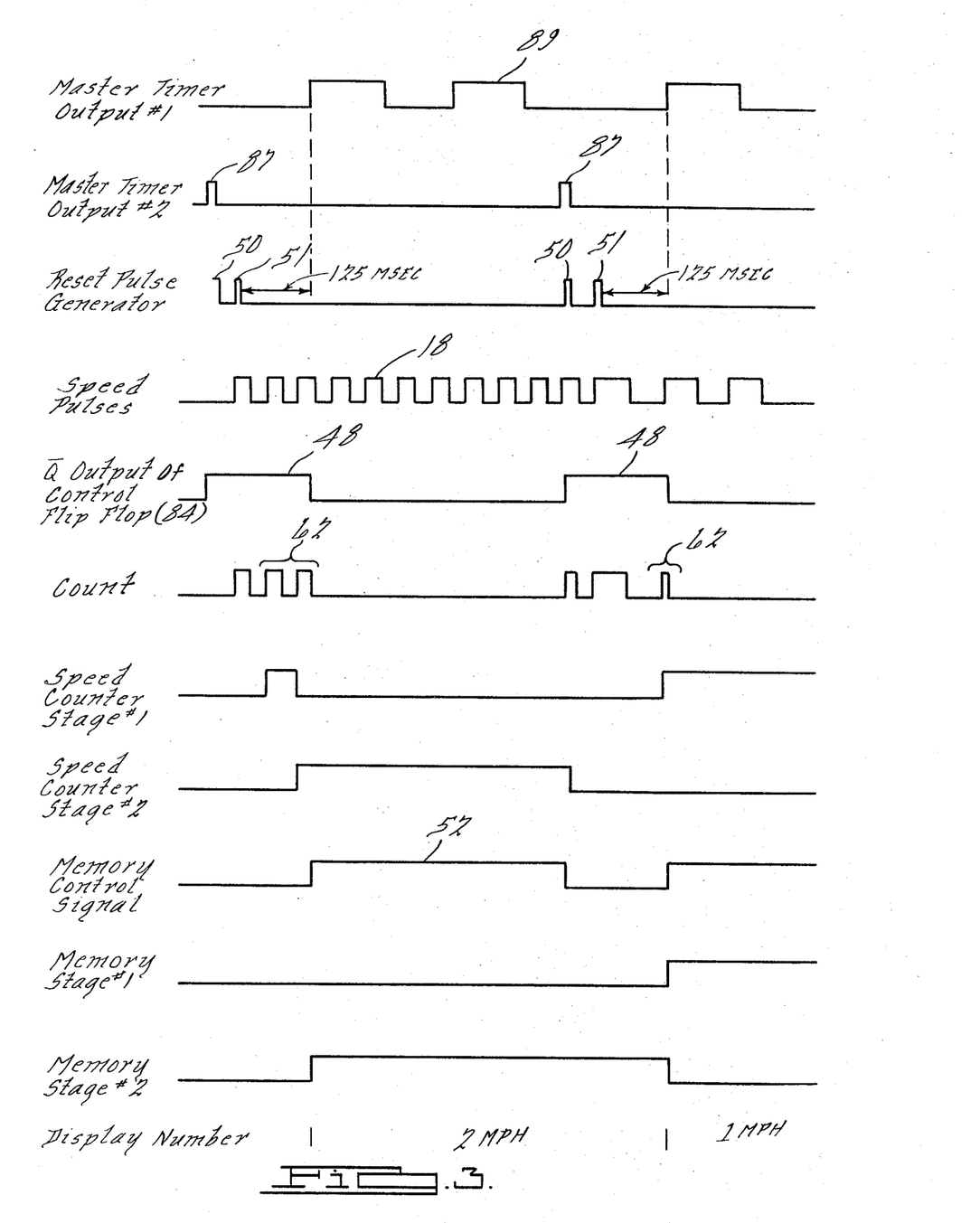
FIG. 3 is a timing diagram of the speedometer of FIG. 1.

Referring to the timing diagram of FIG. 3, the operation of the circuit of FIG. 2 will be explained. The master timer counter 44 counts up to such a value that the output line 86 representing the 0.5 hertz signal is true or high. For purposes of convenience, this output will be labelled as output No. 2 from the master timer counter and the output pulse is labelled 87. This output pulse 87 is supplied to one input of a dual input AND gate 88 wherein the other input is supplied from the "Q" output from the control flip flop 84. The control flip flop 84 is an "RS" flip flop wherein the "S" input is electrically connected by line 89 to the master timer counter 76 at a count representing 4 hertz. This particular output of the master counter will be labelled as output No. 1, 89. An output from the AND gate 88 is generated when output NO. 2 from the master timer counter 76 is true. The output of the AND gate 88 is electrically connected to the "set" input of the trigger flip flop 80.

As previously indicated, the trigger flip flop 80 is a "D" flip flop and when a positive input of voltage is applied to the "set" or "S" input the flip flop 80 will set the "Q" output true. The output from the trigger flip flop 80 is supplied to the reset pulse generator circuit 56 which in the preferred embodiment comprises several NAND gates 90-93, an Exclusive OR gate 94 and a "D" flip flop 96 as illustrated in FIG. 2. The trigger flip flop 80 will remain true and the "Q" output will remain high until a pulse is applied to the clock input from the pulse shaper means 16.

In accordance with the operation of the Exclusive OR circuit 94 when the trigger flip flop 80 is set, the "D" input of the reset flip flop 96 is set. On the occurrence of a signal at the reset flip flop's clock input the "Q" output goes true. The source of signals for the clock input of this paticular flip flop is the 1 MHz signal from the divide by four counter 74 in the master timer counter 44.

The output of the reset flip flop 96 is the reset pulse 50 which is supplied to the 21 stage master timer counter 76 resetting it back to zero and to the control flip flop 84 resetting it to the "Q̄" side. This closes the start speed cycle AND gate 88. The function of the logic of the reset pulse generator 56 is to re-condition the Exclusive OR gate 94 so that there will be no output therefrom as long as a trigger flip flop 80 is set or true. Thus, the output of the cross-coupled NAND gates 92 and 93 in the reset pulse generator circuit supplied to the Exclusive OR gate 94 switches from a zero to a one level causing the output of the Exclusive OR gate 94 to go from a one to a zero level.

The "Q" output of the reset flip flop 96 is also electrically connected to a reset AND gate 98 for resetting the speed counters 100, 101 and 102. As illustrated, these are a pair of decade counters 100 and 101 and a trigger flip flop 102. The two decade counters 100 and 101 represent the units and tens number position of a typical speedometer indicator and the trigger flip flop 102 represents the hundreds position of the speedometer.

Resetting of the control flip flop 96 conditions the speed gate 82 open and allows the transfer of count pulses 62 to the speed counter 60. On the leading edge of the first full width speed pulse 62 from the pulse shaper means 16 after the control flip flop 84 is reset, the trigger flip flop 80 is reset.

The resetting of the trigger flip flop 80 unbalances Exclusive OR gate 94 generating a one output therefrom. This one output is supplied to the reset flip flop 96 which again operates to generate the second pulse 51 to reset both the master timer counter 76 and the speed counter 60. In addition, this pulse 51 causes the output of reset set pulse generator circuit 56 to switch from a one to a zero output re-balancing the Exclusive OR gate 94 and driving its output to zero. As previously indicated, the speed control gate 82 is open at this time and the leading edge of the next full width speed pulse 62 is transferred through the gate 82 to the speed counter 60.

The next pulse from the pulse shaper means 16 is likewise applied to the trigger flip flop 80 but since the flip flop is reset the reset pulse generator 56 is not actuated.

The speed pulse 18 will go to the speed control gate 82 and be counted in the speed counter 60. During this time the master timer counter 76 is counting from zero and after a predetermined count the output No. 1, 89 on the counter 76 goes true turning off the speed control gate 82. As previously indicated, the design of the system of the preferred embodiment is such that the number of speed pulses 62 through the speed control gate 82 is numerically equivalent to the speed of the vehicle in miles per hour. The speed control gate 82 is controlled by the control flip flop 84 and will remain open until the output No. 1, 89 of the master timer counter 76 is driven true a 125 milliseconds after the reset by the second pulse 51 of the timer counter 76.

When the output No. 1 of the master timer counter is applied to the control flip flop 84 its output is switched so that its "Q" output is true closing the speed gate 82. In addition, the "Q" output functions as a strobe to transfer the count in the speed counter 60 into the memory flip flops 64. The output of each memory flip flop is connected to a BCD to seven-segment decoder 104 and 105. The output of each decoder 104 and 105 energizes the liquid crystal drivers for energizing the display 66 according to the count in the memory.

Figure 7:
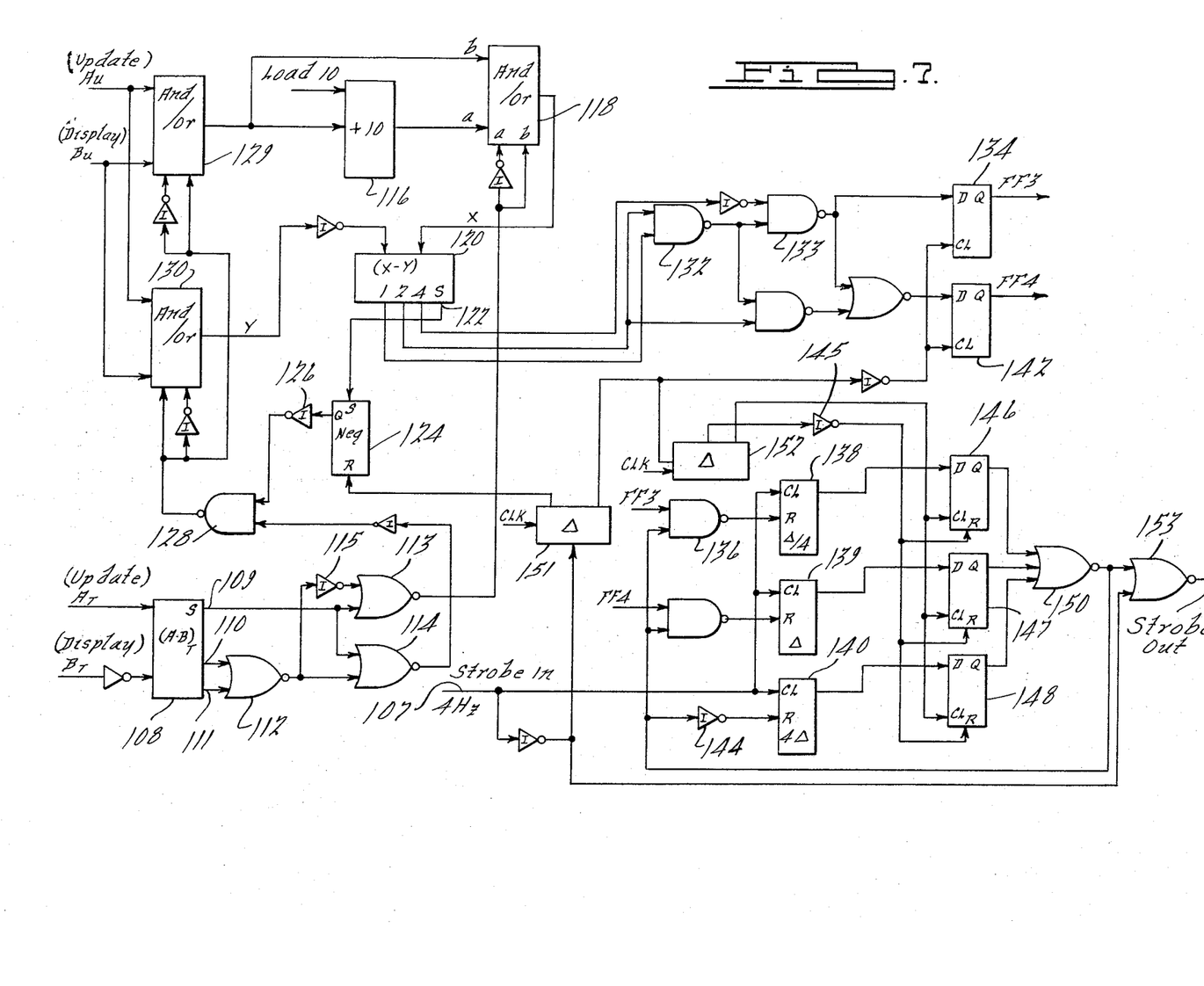
FIG. 7 is a schematic of a computer circuit modification to the system of FIG. 1.

Referring to FIG. 7, there is illustrated in schematic form an automatic interval computer 106 for controlling the strobe signal in FIG. 1. This special purpose computer 106 is illustrated in FIG. 2 in dotted lines showing the logic connection of the computer in the strobe input of the memory 64. Additionally, with the computer connected in circuit, the AND gate 88 has its two inputs respectively connected to the "Q" output of the control flip flop 84 and a 1,024 Hz output from the master timer 76 as illustrated by the dashed line. This change will allow the computer approximately one millisecond to perform its computation. As will be shown, the actual computation is less than 8 microseconds.

The computer functions to control the time between successive strobe pulses according to the magnitude of the change in speed. The faster the rate of speed change, the more often the change in the liquid crystal display.

In the preferred embodiment, the liquid crystal display changes according to the following table:

| Difference (MPH) | Interval |
|---|---|
| 0 | 4 sec. |
| 1 | 4 sec. |
| 2 | 1 sec. |
| 3 or greater | 0.25 sec. |

Due to the parameters used in the preferred embodiment, each of these interval times are readily ascertained in the computer. Various other intervals may be chosen without departing from the teaching herein.

The inputs to the computer are both the BCD signals of displayed digit $B_U$ and $B_T$ found in the memory 64 and the update digit $A_U$ and $A_T$ found in the speed counter 60 for both the units and tens position. In FIG. 7, the update units digit is identified as $A_U$ and the tens digit as $A_T$ while the display units and tens digit are identified as $B_U$ and $B_T$ respectively.

Although the operation of the computer 106 as respects the units and tens digits is simultaneous, the operation will be explained in serial form.

Both the tens digits, $A_T$ and $B_T$ are applied to a subtracter 108 such as RCA's CD4008 or equivalent to determine the direction of the count. The subtracter 108 functions as $(A - B)_T$ and when the difference is negative indicating a speed reduction the sign output, S 109, is true. If the difference is positive, indicating a speed increase, either or both of the lower two outputs 110 and 111, with reference to FIG. 7, are true. If the difference is zero indicating that the decade range is not changing, all the outputs 109–111 are false.

The purpose of determining the direction of change is to determine whether or not one of the units digits is to be increased by 10 for positive subtraction. The rules for a positive subtraction operation of the units digits are as follows:
1. If $(A - B)_T < 0$ then $(B_U + 10) - A_U$
2. If $(A - B)_T > 0$ then $(A_U + 10) - B_U$
3. If $(A - B)_T = 0$ then $(A - B)_U$ or $(B - A)_U$ The output of $(A - B)_T$ subtractor 108 is decoded by three of the NOR gates 112 to 114 and an inverter 115. If the output of second NOR gate 113 is 0 because $(A - B)_T \ne 0$, 10 will be added to either $A_U$ or $B_U$. This addition of 10 is through an adder 116, again an RCA CD4008 or equivalent wherein one addend is a constant 10 and the other addend is either $A_U$ or $B_U$. An AND/OR select module 118 such as RCA's CD4019 or equivalent selects according to the output of the second NOR gate 113 either the adder 116 total or the other addend $A_U$ or $B_U$.

The output selected by the AND/OR select module 118 is applied to a second subtracter 120 $(X - Y)$ as the minuend. If the difference is negative, the sign output 122 goes true setting an R-S flip flop 124 labelled NEG. The "Q" output is applied through an inverter 126 and a NAND gate 128 to the control input of a pair of AND/OR select modules 129 and 130.

Each AND/OR select module 129 and 130 has both the $A_U$ digit and the $B_U$ digit in binary coded decimal form applied to their inputs. A pair of control inputs select either input and transfers the selected input to the output. In the normal condition, where $(X - Y)$ is not equal to a negative number, the first or upper AND/OR select module 129, with reference to FIG. 7, transfers the $A_U$ digit on to become the minuend $(X)$ and the second or lower AND/OR select module 130 transfers the $B_U$ digit to become the subtrahend $(Y)$ in the subtracter 120.

When the difference $(X - Y)$ is positive, the amount appears on the output lines 1, 2 and 4 of the subtracter 120. It is as the result of the magnitude of the difference, that determines the frequency of change of the liquid crystal display 66. In the preferred embodiment, the interval between display changes is according to the previous table.

If the difference is three or more, the NAND logic 132 and 133 from the subtractor 120 applies a true signal to the "D" input of FF3 134. Setting this flip flop 134 applies a true level to one input of a NAND gate 136 controlling a .25 sec. timer 138. The other input to the NAND gate is normally true and goes false when a strobe pulse is generated.

The timers 138–140 in the preferred embodiment are a plurality of counters wherein the output signal interval is a multiple of the 4 hertz "strobe in" signal 107. The first timer 138 is activated by FF3 134 and generates a signal .25 seconds after FF3 is set. The second timer 139 is similarly activated by FF4 142 and generates a signal 1.0 seconds after FF4 is set.

The third timer 140 is normally activated immediately after a strobe pulse from gate 153 is applied through an inverter 144 and will always attempt to generate a signal four seconds after actuation. This timer determines the longest interval between display changes.

Additionally, the computer 106 has a reset timer comprising a pair of four-stage shift registers 151 and 152 which are shifted by the 1 MHz signal from the master timer. The output of the first shift register occurs four microseconds after the input is applied. In the preferred embodiment, this is 4 microseconds after the trailing edge of the "strobe in" signal 107. As previously indicated the "strobe in" signal 107 is one millisecond long as determined by the action of NAND gate 88.

The second shift register 152 generates a first output 2 microseconds after receiving an input and a second output 4 microseconds after the input. The first output is supplied through an inverter 145 to the reset input of the flip flops 146-148. The second output is supplied to the clocking inputs of the flip flops 146-148. When one of the timers 138-140 generates a signal, its corresponding flip flop FF5, FF6 or FF7 146-148 will be set approximately 8 microseconds after the trailing edge of the "strobe in" signal 107. The setting of one of these flip flops applies a true level to one of the inputs of the three input NOR gate 150 switching its output low.

The output of the NOR gate 150 is one input of the NOR gate 153 and the other input is the inversion of the "strobe in" signal 107. At this time, the output of NOR gate 150 is low and the inversion of the "strobe in" signal 107 is high and will remain high until the master timer 76 generates a 4 hertz signal. With a high and low input signal, the NOR gate 153 output is low.

The master counter will generate a "strobe in" signal 107 at a time of 125 milliseconds after the pulse out of the AND gate 88. At this time both inputs to the NOR gate 153 go low generating a strobe pulse to the memory 64. This strobe pulse, due to the timing of the reset timers 151 and 152 will have a time length of approximately 6 microseconds or until the reset output of the second timer 152 is driven low causing the output of the inverter 145 to go high. This will reset the flip flops 146-148 driving the output of the NOR gate 150 high.

Figure 4:
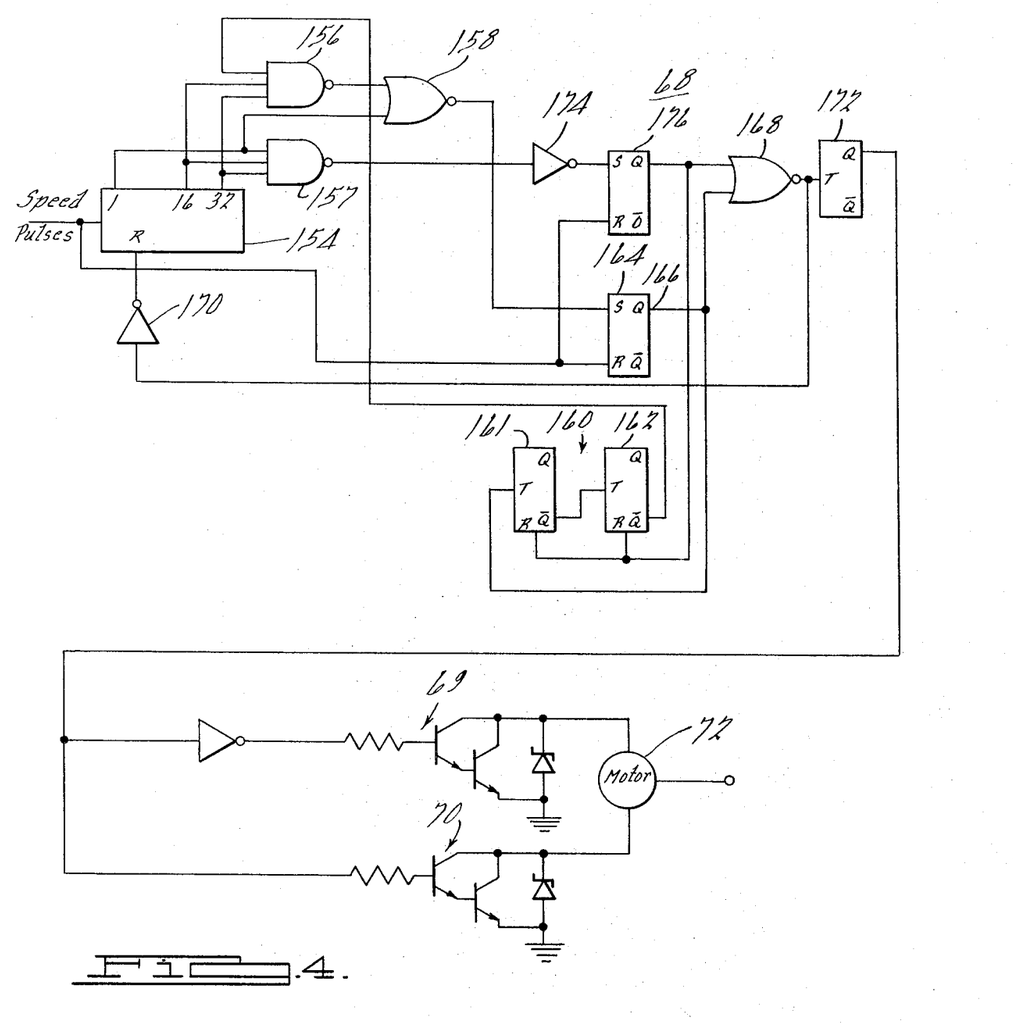
FIG. 4 is a logic diagram of one form of an odometer as may be used in the speedometer of FIG. 1.

The logic schematic of FIG. 4 illustrates the logic of the odometer 68 circuit of FIG. 1. The function of the odometer 68 is to translate the speed pulses 18 from the pulse shaping means 16 into an indication of the distance travelled by the vehicle. In the preferred embodiment, the tone wheel 10 and transducer 12 generate 29,000 pulses per mile of travel. The odometer stepping motor 72 steps 600 times per mile. In order to provide this division it is necessary that the odometer count in groups of either 48 or 49 pulses.

The odometer 68 comprises a six stage counter 154 having outputs at stages one, five and six representing counts of one, 16 and 32. The outputs of the counter 154 are decoded by a pair of NAND gates 156 and 157 and a NOR gate 158. The combination of NAND gate 156 and NOR gate 158 generate a count of 48 and the output of NAND gate 157 represents a count of 49.

A second counter 160 comprising two trigger flip flops 161 and 162 functions to control the output of the NAND gate 156 for gating two counts of 48 for each count of 49 from NAND gate 157. This second counter 160 is counted by means of a signal generated by setting a count flip flop 164 from the output of the NOR gate 158 and resetting the flip flop 164 with the next succeeding speed pulse.

The "Q" output 166 of the count flip flop 164 is supplied to a two input NOR gate 168. The normal output of this gate is high and is driven low by the setting of flip flop 164. The output of the NOR gate 168 is connected through an inverter 170 to the reset of the counter 154 and is also connected to the trigger input of a trigger flip flop 172. Due to the inverter 170, the counter 154 resets when the count flip flop 164 is set.

Additionally, the "Q" output is supplied to the second counter 160 and causes that counter to count on the setting of count flip flop. This will cause the "$\overline{Q}$" output of flip flop 161 to go false.

The next succeeding speed pulse will count the counter 154 to one and reset the count flip flop 164. Resetting of the count flip flop will return the output of NOR gate to a true level causing the flip flop 172 to switch. This switching turns off the one driver 170 and turns on the other driver 69 causing the stepping motor 72 to step one position.

At the next count of 48, the count flip flop 164 again sets and resets causing the second counter to again count. This causes the "$\overline{Q}$" output of flip flop 162 to go low which in turn causes the output of gate 156 to remain high thus disabling that gate.

The counter 154 will now count to a count of 49 driving the output of NAND gate 157 low. An inverter 174 causes the set input of a reset flip flop 176 to go true. The "Q" output is driven true which causes the second counter 160 to reset and also switches the flip flop 172 thereby switching stepper drivers 69 and 70.

In the particular solid state logic shown, the fast rate of speed pulses is divided down into periodic pulses for driving the stepper motor. Using the parameters of the preferred embodiment, the flip flop 172 switches 600 times for every 29,000 pulses from the pulse shaper means 16. It is obvious to change the logic of odometer counting system according to the teaching herein to divide the number of speed pulses by any factor to position the odometer wheels 73. Controlling the second counter 160 provides for fractional counts if the division results in a remainder.

There has thus been shown and described an electronic digital speedometer having a liquid crystal display. Additionally, included within the speedometer is an odometer optional automatic display interval computer section. The values may be changed with departing from the spirit and scope of the disclosure.

I claim:

1. In a motor vehicle, an electronic digital speedometer comprising:
   means for receiving a series of pulses representing the movement of the vehicle,
   pulse shaping means electrically connected to said receiving means for shaping each of said pulses into a substantially rectangular waveshape.
   timing means for generating a plurality of pulses at predetermined intervals independently of said pulses from said pulse shaping means,
   control means responsive to the pulses from said timing means and the pulses from said pulse shaping means for generating a gate control signal, a counter control signal and a memory strobe signal upon the simultaneous occurrence of both of said pulses,
   a counter responsive to said counter control signal for clearing said counter,
   gate means responsive to said gate control signal for gating said pulses from said pulse shaping means to said counter,
   memory means responsive to said counter and said memory strobe signal for retaining the count in said counter during the interval between consecutive gate control signals, digital display means responsive to the count in said memory means for displaying the count in said memory, said count representing the speed of said motor vehicle, and a strobe interval computer responsive to the count in said memory means and the updated count in said counter for determining the interval between succeesive displays of said display means according to the difference between each of said memory count and said updated count and generating said memory strobe signal in response to said determination.

2. In a motor vehicle an electronic digital speedometer comprising:

means for generating a pulse train whose frequency represents the vehicle speed;

means for generating a second pulse train forming a timing base;

counting circuit means for counting pulses in said first-mentioned pulse train;

memory and digital display means for memorizing and displaying an accumulated count in said counting circuit means; and control circuit means operatively coupling said first-mentioned means and said second-mentioned means with said counting circuit means and said memory and digital display means such that pulses in said first pulse train are periodically gated to said counting circuit means to be accumulated by said counting circuit means during a counting interval defined by a given number of pulses of said second pulse train and the count accumulated by said counting circuit means at the conclusion of each counting interval is then memorized and displayed by said memory and digital display means in timed relation to the termination of the counting interval; said control circuit means including computing means for comparing each count in said memory and digital display means with the count accumulated by said counting circuit means during a subsequent counting interval and for changing said timed relation in accordance with the comparison.

3. In a motor vehicle an electronic digital speedometer comprising:

means for generating a pulse train whose frequency represents the vehicle speed;

means for generating a second pulse train forming a timing base;

counting circuit means for counting pulses in said first-mentioned pulse train;

memory and digital display means for memorizing and displaying a count in said counting circuit means; and control circuit means operatively coupling said first-mentioned means and said second-mentioned means with said counting circuit means and said memory and digital display means such that pulses in said first pulse train are periodically gated to said counting circuit means during a counting interval defined by a given number of pulses of said second pulse train and the accumulated count in said counting circuit means is then memorized and displayed by said memory and digital display means; said control circuit means including means for resetting said counting circuit means in response to one of the pulses of said first pulse train occurring subsequent to the completion of a counting interval and means for starting a subsequent counting interval in response to a pulse of said first pulse train subsequent to said one pulse thereof.

4. An electronic digital speedometer as claimed in claim 3 wherein said control circuit means comprises means responsive to a predetermined characteristic of the pulse in said first pulse train for starting the subsequent counting interval.

* * * * *